(12) United States Patent  
Leon et al.

(10) Patent No.: US 7,526,174 B2
(45) Date of Patent: Apr. 28, 2009

(54) UNIVERSAL SPLITTER MODULE HOLDER FOR AN OPTIC FIBER DISTRIBUTION HUB

(75) Inventors: Eduardo Leon, Woodridge, IL (US); Daniel Sedlecky, Naperville, IL (US); George Wakileh, Batavia, IL (US)

(73) Assignee: Emerson Network Power, Energy Systems, North America, Inc., Warrenville, IL (US)

( * ) Notice: Subject to any disclaimer, the term of this patent is extended or adjusted under 35 U.S.C. 154(b) by 0 days.

(21) Appl. No.: 11/748,642

(22) Filed: May 15, 2007

(65) Prior Publication Data

US 2008/0080827 A1 Apr. 3, 2008

Related U.S. Application Data

(60) Provisional application No. 60/848,901, filed on Oct. 2, 2006.

(51) Int. Cl.
*G02B 6/00* (2006.01)
(52) U.S. Cl. .............. 385/136; 385/134; 385/135; 385/147
(58) Field of Classification Search ............. 385/136
See application file for complete search history.

(56) References Cited

U.S. PATENT DOCUMENTS

| | | | | |
|---|---|---|---|---|
| 5,127,082 | A * | 6/1992 | Below et al. | 385/135 |
| 5,339,379 | A | 8/1994 | Kutsch et al. | |
| 5,412,497 | A | 5/1995 | Kaetsu et al. | |
| 5,430,823 | A | 7/1995 | Dupont et al. | |
| 5,625,737 | A * | 4/1997 | Saito | 385/137 |
| 5,754,723 | A * | 5/1998 | Fremgen | 385/135 |
| 5,966,492 | A | 10/1999 | Bechamps et al. | |
| 6,044,193 | A | 3/2000 | Szentesi et al. | |
| 6,201,919 | B1 | 3/2001 | Puetz et al. | |
| 6,249,634 | B1 * | 6/2001 | Tenney et al. | 385/135 |
| 6,301,423 | B1 | 10/2001 | Olson | |
| 6,418,262 | B1 | 7/2002 | Puetz et al. | |
| 6,424,781 | B1 | 7/2002 | Puetz et al. | |
| 6,501,899 | B1 | 12/2002 | Marrs et al. | |
| 6,532,332 | B2 | 3/2003 | Solheid et al. | |
| 6,539,161 | B2 * | 3/2003 | Holman et al. | 385/136 |
| 6,591,053 | B2 | 7/2003 | Fritz | |
| 6,633,717 | B1 | 10/2003 | Knight et al. | |
| 6,792,191 | B1 | 9/2004 | Clap, Jr. et al. | |
| 6,920,274 | B2 * | 7/2005 | Rapp et al. | 385/135 |

(Continued)

OTHER PUBLICATIONS

Emerson Network Power, NetSpan™ Fiber Distribution Hub, Fiber Cross-Connect Enclosure; www.emersonnetworkpower.com/energysystems/osp-fo-FDH.asp; pp. 1-2.

*Primary Examiner*—Frank G Font
*Assistant Examiner*—Ryan Lepisto
(74) *Attorney, Agent, or Firm*—Harness, Dickey & Pierce, P.L.C.

(57) ABSTRACT

In accordance with various embodiments, universal splitter module holder for a fiber optic distribution hub is provided. The universal hub splitter module holder is structured to retain any one of a plurality of fiber optic splitter modules within the fiber optic distribution hub. The universal splitter module holder includes a base and a hood removably connectable to the base to clamp and retain the splitter module between the base and the hood.

28 Claims, 9 Drawing Sheets

U.S. PATENT DOCUMENTS

| | | |
|---|---|---|
| 7,194,181 B2 | 3/2007 | Holmberg et al. |
| 2002/0181922 A1 | 12/2002 | Xin et al. |
| 2004/0109660 A1 | 6/2004 | Liberty |
| 2004/0175089 A1 | 9/2004 | Dagley et al. |
| 2004/0218888 A1* | 11/2004 | Daoud et al. ............ 385/136 |
| 2004/0228597 A1 | 11/2004 | Blackwell |
| 2005/0281526 A1 | 12/2005 | Vongseng et al. |
| 2006/0093301 A1 | 5/2006 | Zimmel et al. |
| 2006/0093302 A1 | 5/2006 | Solheid et al. |
| 2006/0177190 A1 | 8/2006 | Vongseng et al. |
| 2006/0251374 A1* | 11/2006 | Chou et al. ............ 385/136 |

* cited by examiner

UNIVERSAL SPLITTER MODULE HOLDER FOR AN OPTIC FIBER DISTRIBUTION HUB

CROSS-REFERENCE TO RELATED APPLICATIONS

This application claims the benefit of U.S. Provisional Application No. 60/848,901, filed on Oct. 2, 2006. The disclosure of the above application is incorporated herein by reference.

FIELD

The present disclosure generally relates to modular optic fiber distribution hubs to be used in outside environments.

BACKGROUND

The statements in this section merely provide background information related to the present disclosure and may not constitute prior art.

Fiber optic data transmission has become the state of the art method of transmitting data short and long distances. For example, optical data transmission systems are commonly implemented to communicate data and information throughout an office building, and also to transmit data and information between various locations separated by long distances. Over the past few years, the telecommunication industry, for example, has implemented massive communications networks by installing millions of miles of fiber optic communication lines throughout the world.

Various facilities, e.g., commercial, industrial and/or residential buildings, within such massive communication networks are often interconnected with each other or to a central office using fiber distribution hubs. The distribution hubs are located in various outdoor locations between the interconnected facilities. Generally, the distribution hubs receive data, i.e., information, data and/or communication signals, from one or more facilities via fiber optic inputs then divide and distribute the data to one or more other facilities fiber optically connected the hub. More particularly, the typical fiber optic distribution hub includes one or more optical splitters that receive data signals via one or more fiber optic input lines. The splitters divide each input data signal into a plurality of signals sent to a plurality of output ports of the respective splitter. Fiber optic jumpers are connected between the splitter ports and a fiber distribution module within the distribution hub. The fiber distribution module distributes the split signals to various designated facilities, e.g., customers, by interconnecting the hub, i.e., the various fiber optic jumpers, with the various designated facilities, via output fiber optic lines connected between the facilities and the distribution module.

Thus, for example, for a telecommunication company to provide service to a facility, e.g., a customer's residence, there must be a fiber optic line connected between the facility and the distribution module of the distribution hub. To enable the service, a technician then must open a cabinet of the distribution hub and physically connect a fiber optic jumper between an available splitter port and the distribution module. Typically, the jumper is connected to a jumper side of a service connection adapter retained within a service connection tray of the distribution module. The other side of the service connection adapter is connected to the fiber optic line from the facility. The interconnection between the jumpers and the facility optic lines, via the adapters, are often referred to as connection circuits.

If a large number of facilities are connected to a single fiber optic distribution hub, the hub can become very populated with fiber jumpers extending between the splitter and the distribution module. Moreover, the distribution module can become very congested and densely packed with the fibers of the connection circuits. Accordingly, a technician can have a difficult time connecting new jumpers and disconnecting and servicing existing circuits within the distribution module without disturbing the fibers of surrounding circuits.

Additionally, as more and more facilities are interconnected via a distribution hub, it often becomes necessary to add additional splitters to provide connectivity for the increasing number of facilities. However, typically optic fiber hubs are fabricated to utilize a single type and manufacture of splitter. Therefore, when additional splitters are needed to increase the service capacity of a hub, only a particular type and manufacture splitter can be installed. This restriction can be cumbersome if the needed splitter type is not readily available and can be cost inefficient.

Furthermore, as the service capacity of a fiber optic hub increases, the number of fiber optic jumpers between the splitters and the distribution module also increases. For example, if a hub distribution module has one hundred forty-four service connection adapters, at full capacity the hub would have the fibers of one hundred forty-four jumpers extending between the splitters and the distribution module. The jumpers are typically fabricated to have a common length so that each jumper has sufficient length to extend between any splitter and any service connection adapter within the distribution hub. Accordingly, there is commonly slack in the jumper fibers that is left to randomly dangle within the distribution hub. Such slack can be unwieldy and burdensome for a technician to work with when connecting new jumpers, disconnecting and servicing existing circuits.

SUMMARY

In accordance with various embodiments of the present disclosure, a universal splitter module holder for a fiber optic distribution hub is provided. The universal hub splitter module holder is structured to retain any one of a plurality of fiber optic splitter modules within a fiber optic distribution hub. The universal splitter module holder includes a base and a hood removably connectable to the base to clamp and retain the splitter module between the base and the hood.

In accordance with various other embodiments of the present disclosure, a universal splitter module holder for a fiber optic distribution hub is provided. The universal splitter module holder includes a base and a hood removably connectable to the base to retain the splitter module between the base and the hood. The base includes fins along opposing side walls that are slideably engageable with guides along opposing walls of a splitter module rack of the distribution hub. By slideably engaging the fins with the guides the universal splitter module holder and splitter module is removably stored within the splitter module rack.

In accordance with still other various embodiments of the present disclosure, a method for retaining any one of a plurality of fiber optic splitter modules within a fiber optic distribution hub is provided. The method includes retaining a fiber optic splitter module within a universal splitter module holder having a hood removably connectable to a base. The method additionally includes removably storing the universal splitter module holder, having the splitter module retained therein, within a splitter module rack of the distribution hub.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
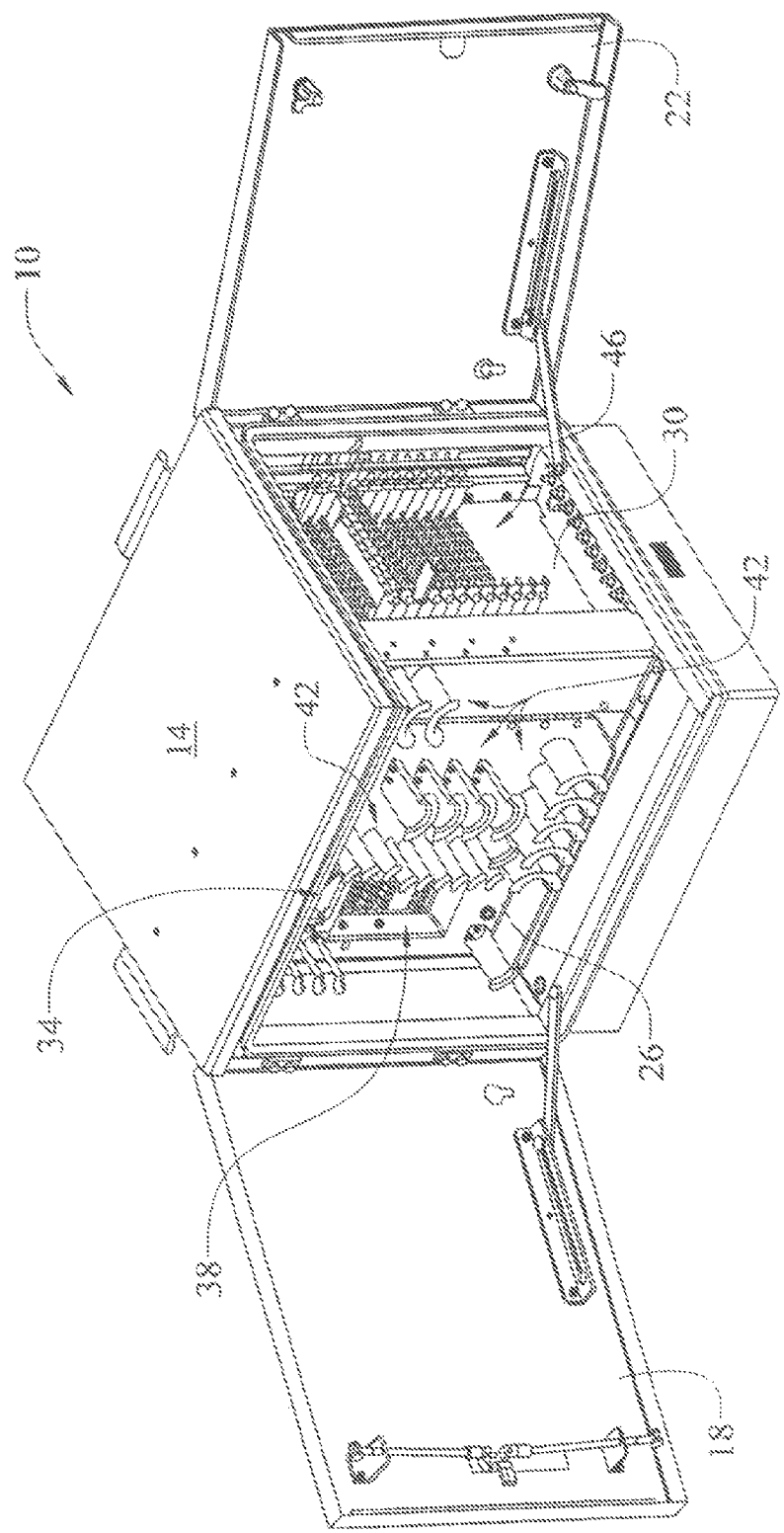
FIG. 1 is an isometric view of an optic fiber distribution hub, in accordance with various embodiments of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, an optic fiber distribution hub 10 is illustrated, in accordance with various embodiments of the present disclosure. For simplicity and clarity the optic fiber distribution hub 10, will be referred to herein simply as the hub 10. The hub 10 includes a cabinet 14 that houses various signal splitting, signal distribution, fiber routing and fiber storage components, systems and assemblies, as will be described below, that provide data transmission connectivity between a plurality of facilities, e.g., commercial, industrial and/or residential buildings, and one or more central sources of the data transmissions. The cabinet 10 can include one or more access panels, for example doors 18 and 22, that provide access to the components, systems and assemblies that are mounted to or supported by one or more internal panels, for example internal panels 26 and 30.

Figure 2:
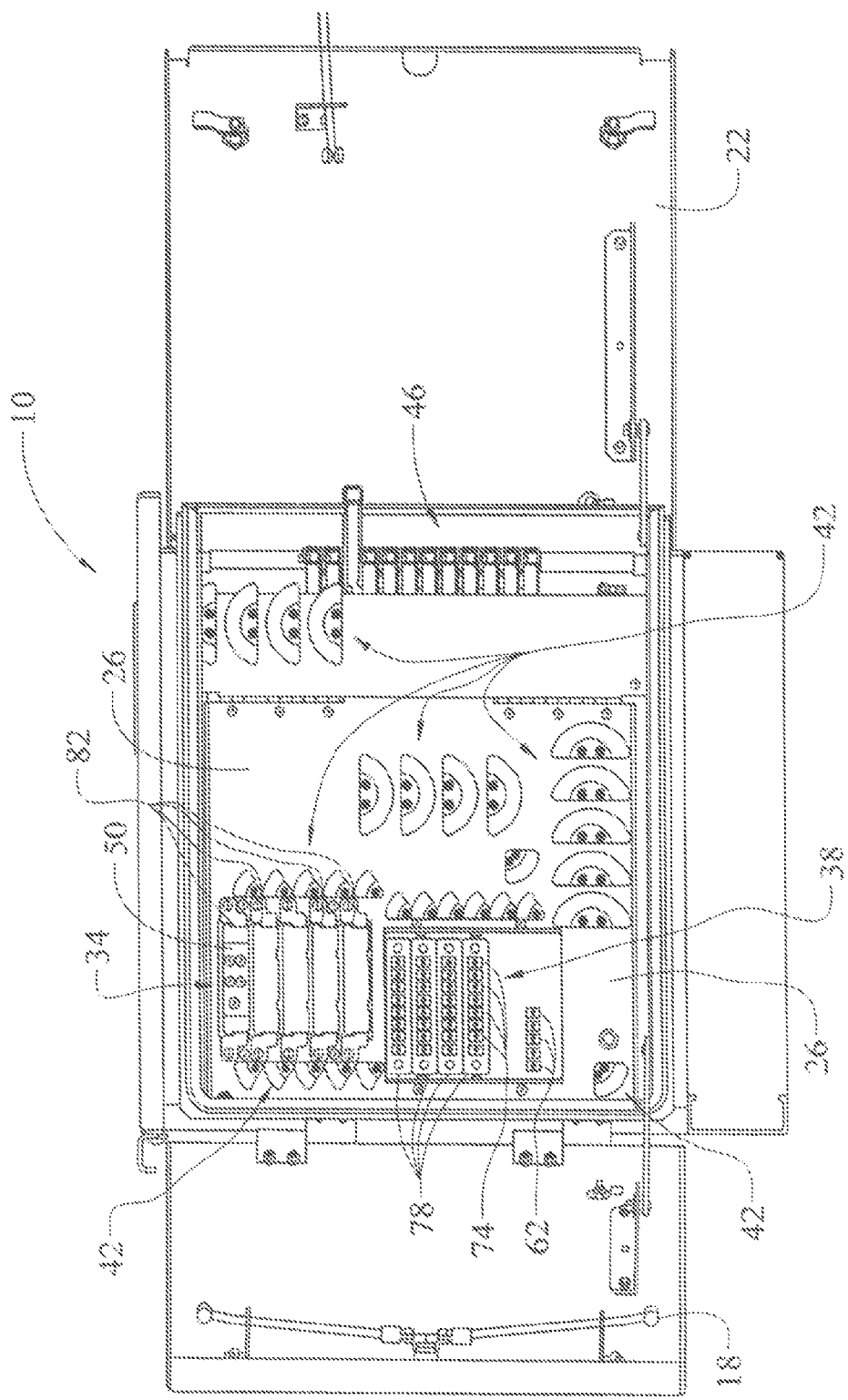
FIG. 2 is a splitter-side side view of the optic fiber distribution hub shown in FIG. 1, in accordance with various embodiments of the present disclosure.
Figure 3:
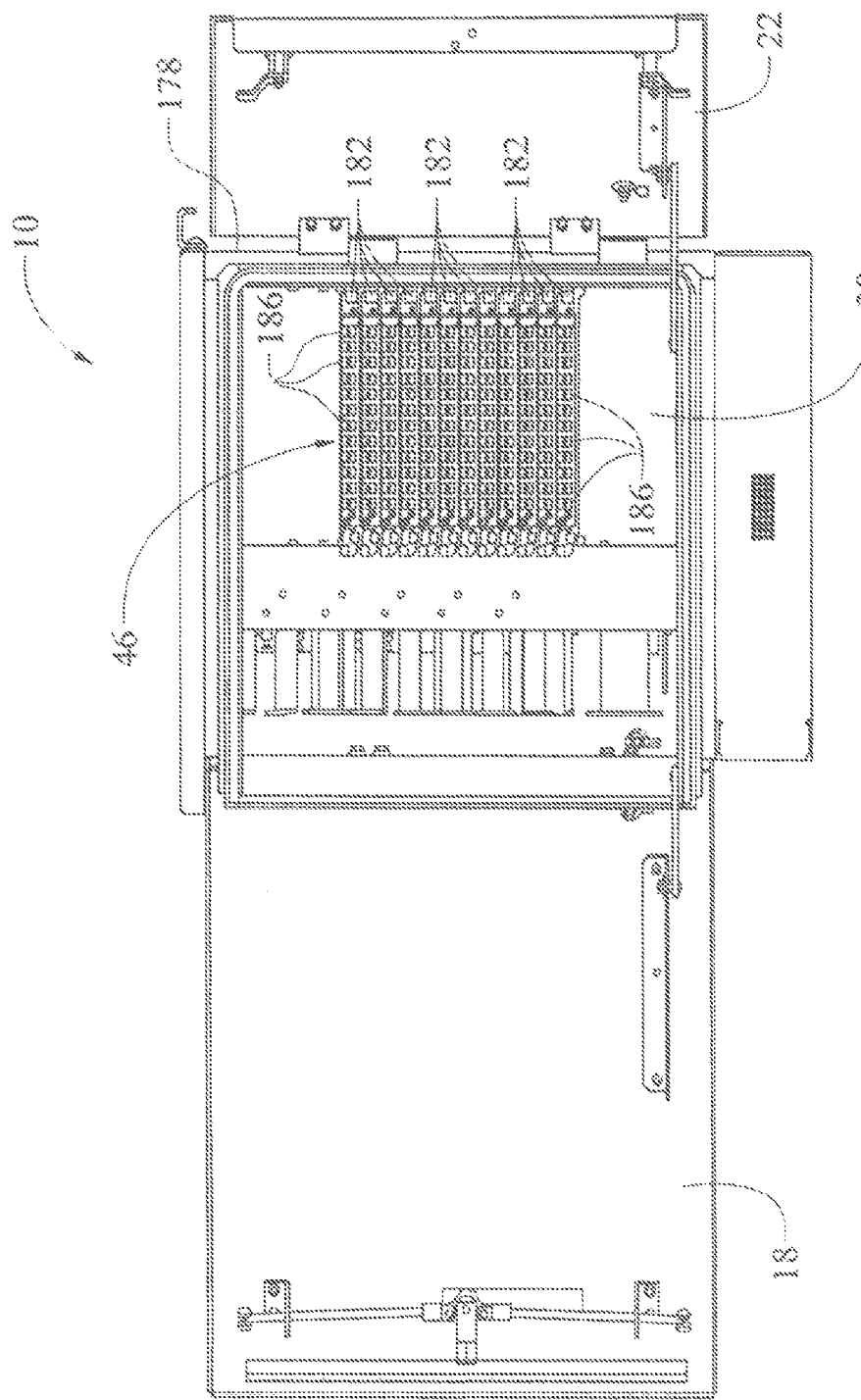
FIG. 3 is a distribution-side side view of the optic fiber distribution hub shown in FIG. 1, in accordance with various embodiments of the present disclosure.

Referring additionally to FIGS. 2 and 3, the components, system and assemblies of hub 10 will now be described in detail. The hub 10 includes a splitter rack 34 (best illustrated in FIG. 4) mounted to and supported by the internal panel 26. In various embodiments, the hub 10 can additionally include a jumper parking bay 38 mounted to and supported by the internal panel 26. In various other embodiments, the hub 10 can further include a distribution jumper incremental slack limiting fiber management system 42 also mounted to the internal panel 26. For clarity and simplicity, hereafter, the internal panel 26 will be referred to as the splitter-side panel 26 and the distribution jumper incremental slack limiting fiber management system 42 will be referred to simply as the slack limiting system 42. Additionally, the hub 10 includes at least one distribution module 46 mounted to and supported by the internal panel 30, hereafter referred to as the distribution-side internal panel 30.

Figure 4:
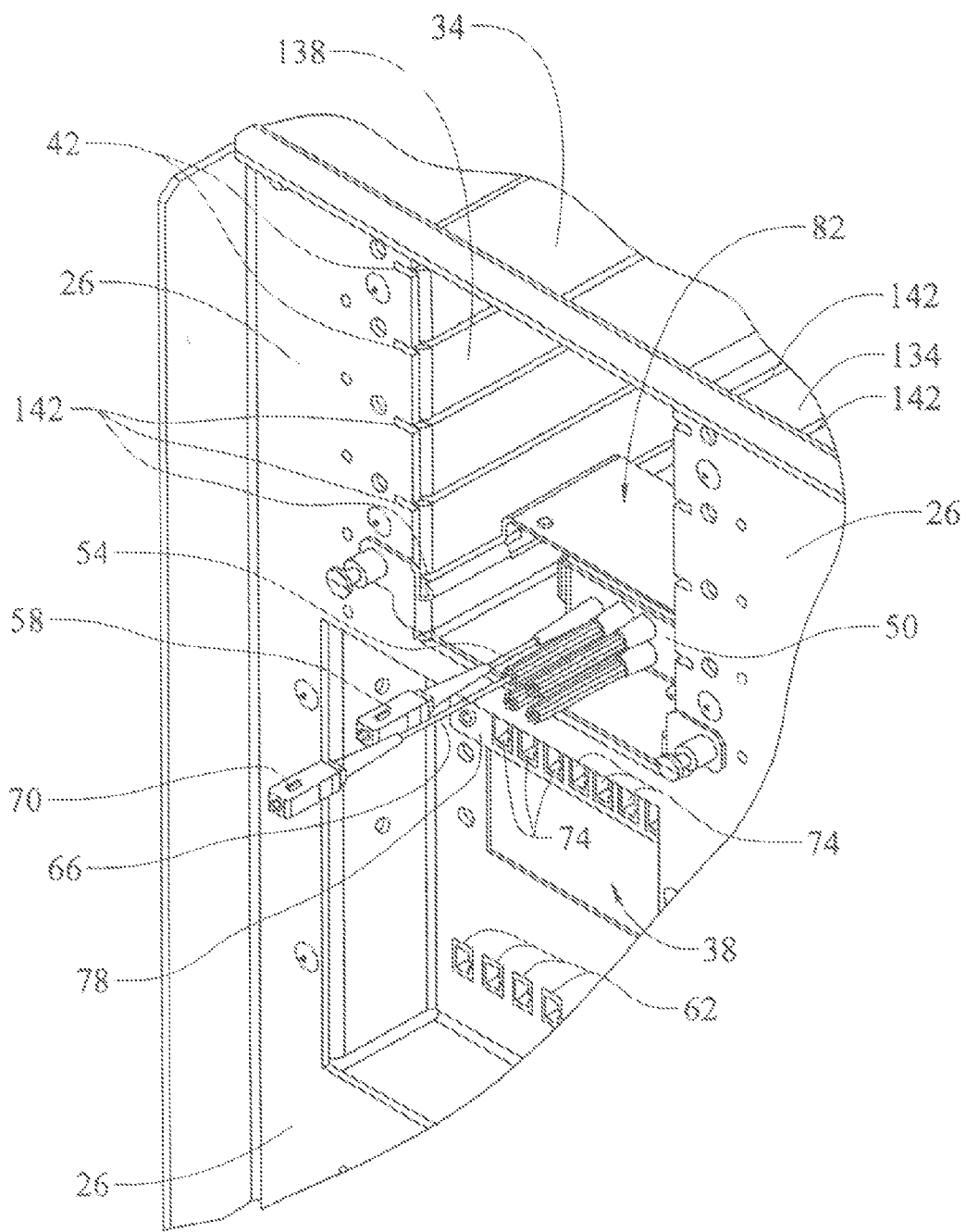
FIG. 4 is an isometric detail view of a portion of the optic fiber distribution hub shown in FIG. 1 including a splitter rack, in accordance with various embodiments of the present disclosure.

Referring to FIGS. 2 and 4, the splitter rack 34 is generally a modular housing for securing one or more fiber optic splitter modules 50 within the hub 10. The splitter rack 34 is mounted to the splitter-side internal panel 26 such that the splitter rack 34 extends inward from the splitter-side internal panel 26, away from the door 18, hereafter referred to as the splitter-side door 18.

Each splitter module 50 includes an optic fiber feeder pigtail, or jumper, 54 that includes a connection terminal 58 for connecting the feeder pigtail 54 to one of a plurality of hub input ports 62. The hub input ports 62 are connected to the one or more central sources of the data transmissions that are to be divided, i.e., split, and distributed to the various facilities designated to receive the data transmissions. Each feeder pigtail 54 is routed, or threaded, through the slack limiting system 42, as described below, to eliminate slack in the feeder pigtails 54 that can be cumbersome to a technician servicing the hub 10.

Each splitter additionally includes a plurality of optic fiber output pigtails, or jumpers 66. Each output jumper 66 includes a connection terminal 70 for connecting the respective jumper 66 to either the distribution module 46, as described below, or to one of a plurality of parking ports 74 of the parking bay 38. For simplicity and clarity, only a single output jumper 66 is shown including the connection terminal 70, while only proximal end portions of the remaining jumpers 66 are shown. The feeder pigtail connection terminal(s) 58 and the output jumper connection terminals 70 can be the same type/style connectors or different type/style connectors. However, all the output jumper terminals 70 are the same type/style connector.

The parking ports 74 are a plurality of null, or benign, ports mounted within the parking bay 38. In various embodiments, the parking bay 38 includes one or more parking port banks 78 that each includes a plurality of parking ports 74. The parking ports 74 are utilized for connecting unused output jumpers 66, i.e., reserve jumpers 66, that are not yet connected to the distribution module 46 to provide data transmission connectivity to a designated facility. The reserve jumpers 66 are routed, or threaded, through the slack limiting system 42, as described below, to eliminate slack in the reserve jumpers 66 that can be cumbersome to a technician servicing the hub 10. The active output jumpers 66 connected to the distribution module 46 are also routed, or threaded, through the slack limiting system 42, as described below, to eliminate slack in the active jumpers 66.

Referring now to FIGS. 2, 4, 5 and 6, as described above, the splitter rack 34 is generally a modular housing for securing one or more optic splitters modules 50 within the hub 10. More specifically, in accordance with various embodiments, the splitter rack 34 is adapted to secure and retain one or more universal splitter module holders (USMHs) 82. For simplicity and clarity, the one or more universal splitter module holders 82 will be described herein in terms of a single universal splitter module holder 82. The USMH 82 is structured to retain generally any make or model of splitter module 50. That is, the USMH 82 is structured to be able to retain any splitter module 50 regardless of the type, style, model, shape, size and manufacturer of the splitter module 50. Therefore, a plurality of different types styles, models, shapes, sizes and manufacturers of splitter modules 50 can be simultaneously implemented and utilized within the hub 50 without needing any modifications to the hub 10.

Figure 5:
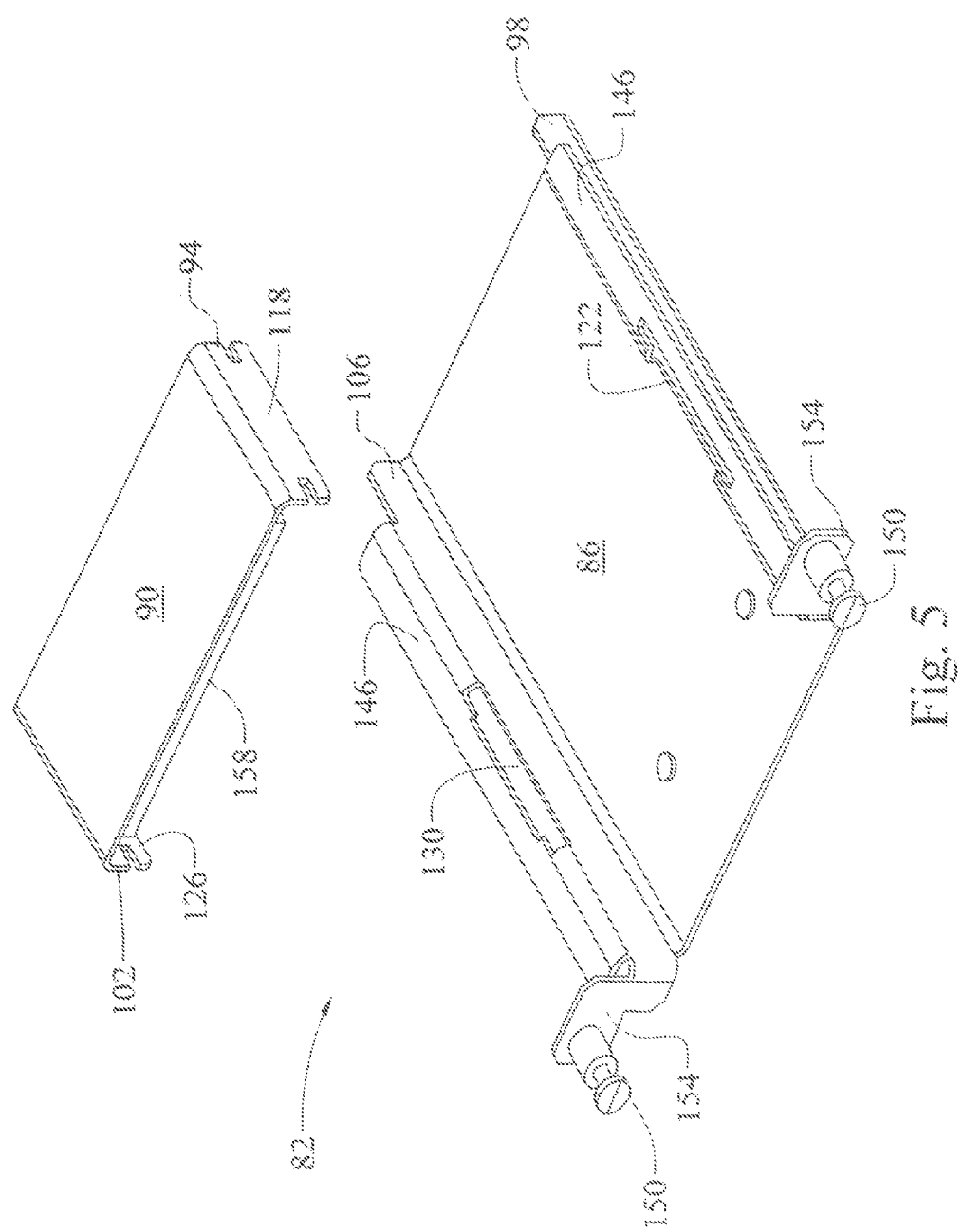
FIG. 5 is an isometric exploded view of a universal splitter module holder included in the optic fiber distribution hub, shown in FIG. 1, in accordance with various embodiments of the present disclosure.
Figure 6:
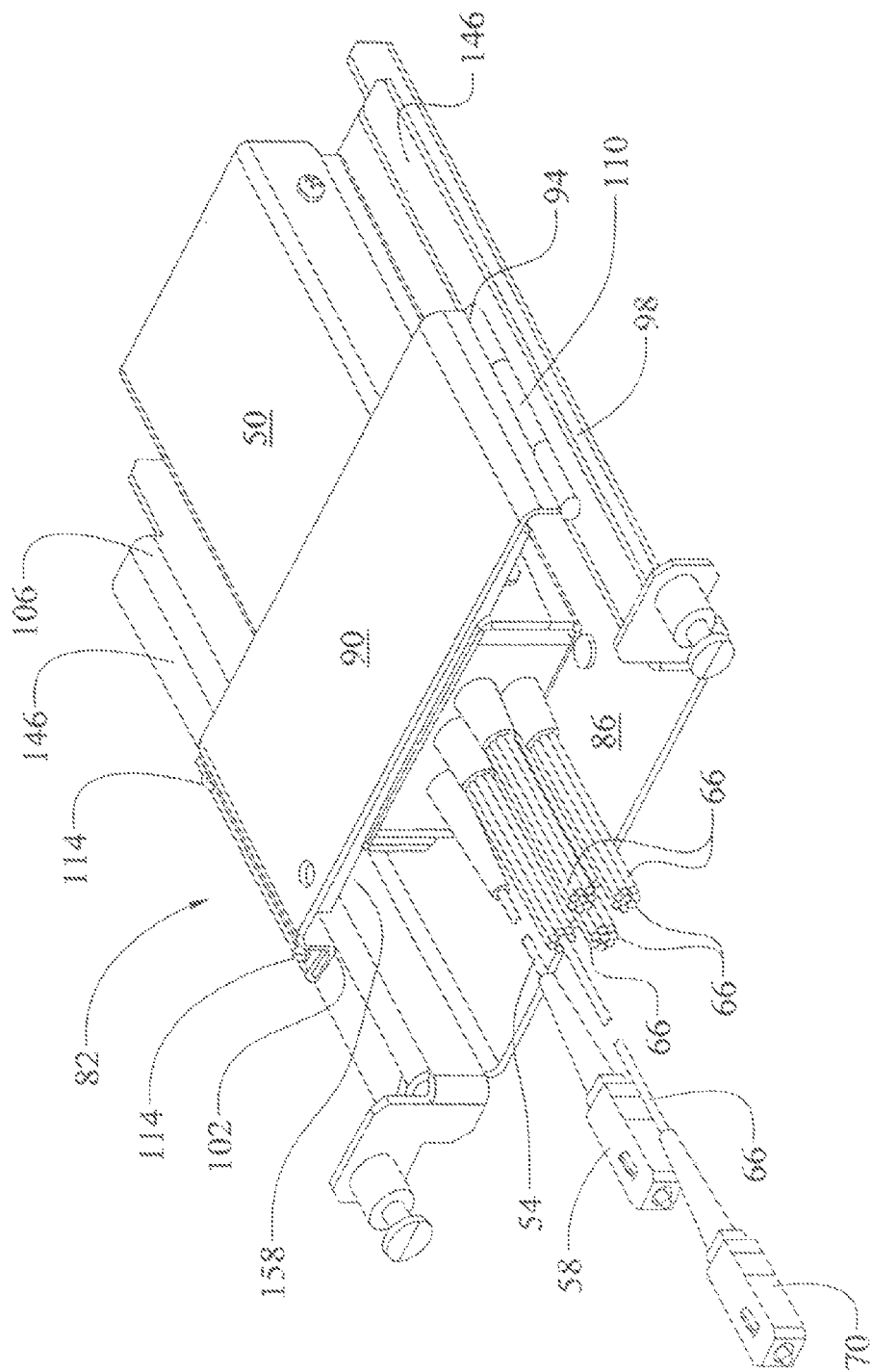
FIG. 6 is an isometric view of the universal splitter module holder, shown in FIG. 5, having a fiber optic splitter retained therein, in accordance with various embodiments of the present disclosure.

Referring specifically to FIGS. 5 and 6, in accordance with various embodiments, the USMH 82 includes a base 86 and a hood 90 that is removably connectable to the base 86 to clamp and retain the splitter module 50 therebetween. The splitter module 50 is set on the base 86 and the hood 90 is the placed across the top of the splitter module 50. The hood 90 is then removably connected to the base 86 to clamp and retain the splitter module 50 within the USMH 82. The hood 90 can be connected to the base 86 in any fashion suitable for allowing the hood 90 to be disconnected, e.g., removed, expanded or opened and then reconnected, e.g., replaced, retracted or closed, once the splitter module 50 has been placed on, or removed from, the base 86.

For example, in various embodiments, as illustrated in FIG. 6, the hood 90 comprises a first end 94 that is hingedly or pivotally coupled to a first wall 98 of the base 86, and a second end 102 removably connectable with a second wall 106 of the base 86. The first end 94 can be hingedly or pivotally connected to the base first wall 106 using any suitable hinge or pivot joint or device 110, such as a piano hinge, butt hinge, barrel hinge, or slot and tongue pivot joint. The second end 102 can be removably connectable with the second wall 106 using any suitable connecting, latching or fastening device or system 114 that can be engaged to securely connect the hood second end 102 with base second wall 106 and disengaged to allow the hood to be lifted. For example, the second end 102 can be removably connectable with the second wall 106 using a snap fastener, a screw fastener, a nut and bolt connecting system or a latch device.

In various other embodiments, the hood 90 can be separable from the base 86 such that both the first and second hood ends 94 and 102 are removably connectable with the respective base first and second walls 98 and 106. For example, as illustrated in FIG. 5, the hood first end 94 can include a winged tab 118 interlockingly engageble with a slot 122 in the first wall 98 of the base 86. Similarly, the hood second end 102 can include a winged tab 126 interlockingly engageble with a slot 130 in the base second 106. In various other embodiments, the hood first and second ends 94 and 102 can be removably connectable with the respective base first and second walls 98 and 106 using any suitable connecting, latching or fastening device or system that can be engaged to securely connect the hood first and second ends 94 and 102 with base first and second walls 98 and 106 and disengaged to allow the hood to be removed. For example, the hood first and second ends 94 and 102 can be removably connectable with the base first and second walls 98 and 106 using snap fasteners, screw fasteners, nut and bolt connecting systems or latch devices.

Referring now to FIGS. 4, 5 and 6, the splitter rack 34 includes a first side wall 134 and an opposing second side wall 138 that each include a plurality of USMH guides 142 that align, support and separate the USMHs retained within the splitter rack 34. In various embodiments, the guides 142 comprise spaced apart slots that extend depth-wise, i.e., from the front of the splitter rack 34 to the back of the splitter rack 34, along the first and second walls 134 and 138. The USMH 82 includes fins 146 that are cooperative with and slidingly engageable with the guides 142. That is, the fins 146 can be inserted into and slid within the guides 142 to align, support and separate the USMHs 82 retained within the splitter rack 34. In various implementations, the fins 146 are formed with or attached to the base first and second walls 98 and 106. In various alternative embodiments, the guides 142 can comprise any other suitable means for slidingly engaging the USMHs 82 to align, support and separate the USMHs 82 within the splitter rack 34, such as L-brackets attached to and extending depth-wise along the splitter rack first and second walls 134 and 138. Accordingly, the fins 146 set on top of and slidingly engage the L-brackets. Or, the guides 142 can be channels formed in and extending depth-wise along the first and second walls 134 and 138, wherein the fins 146 would ride within and slidingly engage the channels. Additionally, although the fins 146 are illustrated as longitudinally extending the length of the USMH 82, the fins 146 can comprise separate fore and aft fins along each side of the USMH 82 or fore and aft pins or posts extending orthogonally from each side of the USMH 82.

The USMH 82 additionally includes at least one latching mechanism 150 for removably retaining the USMH 82 engaged with the distribution hub 10, i.e., engaged with the splitter-side internal panel 26. Thus, once the USMH 82 is inserted into splitter rack 34 the USMH 82 is secured to the splitter-side internal panel 26, via the latching mechanism 150. In various embodiments, the latching mechanism 150 can be a screw extending through at least one stop tab 154 of the base 86. The stop tabs 154 contact the splitter-side panel 26 when the respective USMH 82 is fully inserted into the splitter cage 34 and the screw is insertable through an aperture in the stop tab 154 and threadable into splitter-side internal panel 26. Alternatively, the latching mechanism 150 can be any device or mechanism suitable for securing the USMH 82 within the splitter rack 34, such as magnets, push pins, snaps or cam latches.

In various implementations, the USMH additionally includes a compressible pad, or gasket, 158 affixed to a bottom of the hood 90. The compressible pad 158 engages and substantially compresses around a top surface of the splitter module 50 when the hood 90 is put in place and fastened to the base 86. Accordingly, the compressible pad 158 applies pressure to the splitter module top surface to securely retain the splitter module 50 within the USMH 82. Additionally, the compressible pad 158 accommodates for different ranges of thickness of the various splitter module 50 that can be retained by the USMH 82. The compressible pad 158 can be fabricated of any suitably compressible and resilient material such foam rubber or any other synthetic sheet foam material.

Figure 7:
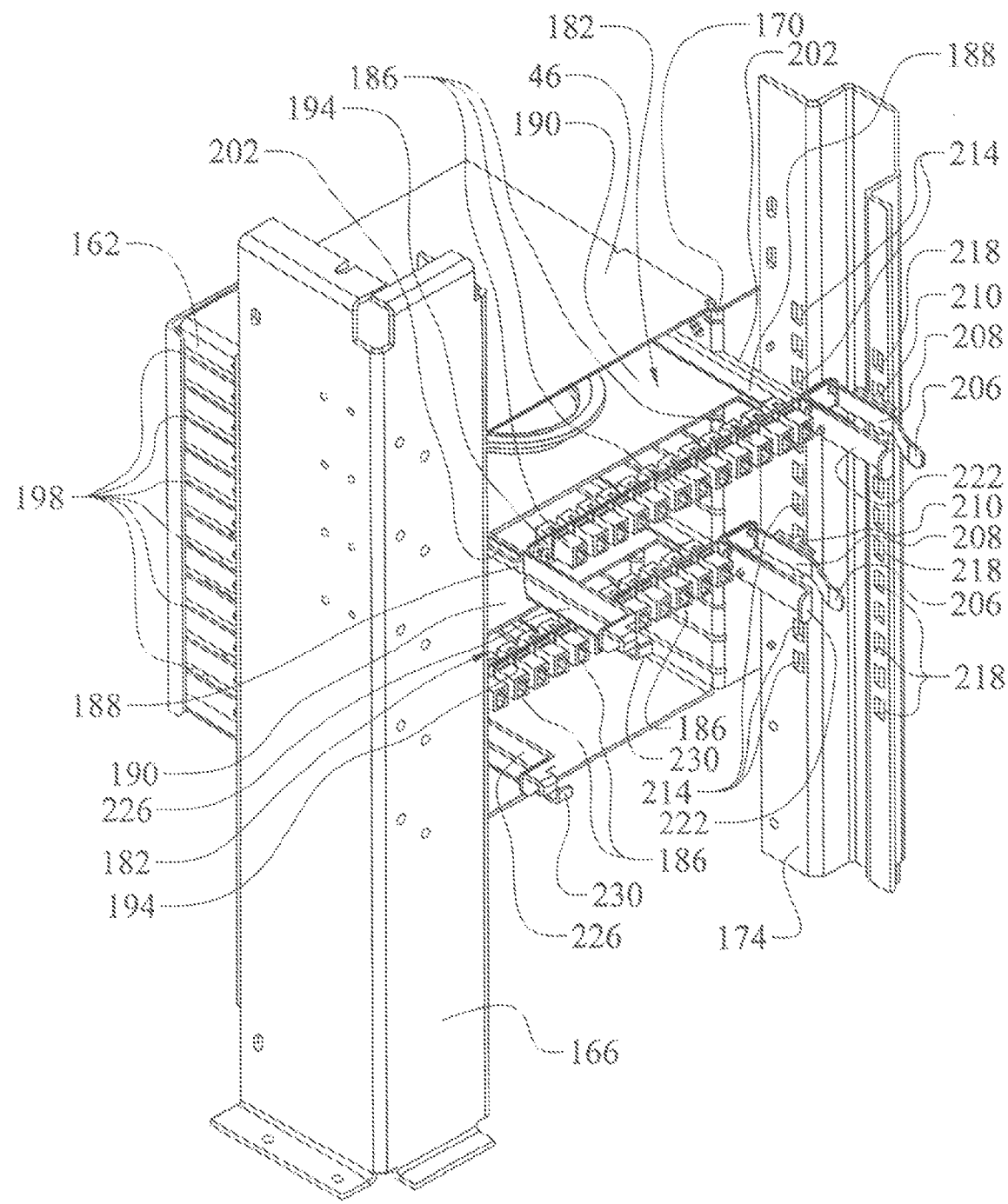
FIG. 7 is an isometric view of a distribution module included in the optic fiber distribution hub shown in FIG. 1, in accordance with various embodiments of the present disclosure.
Figure 8:
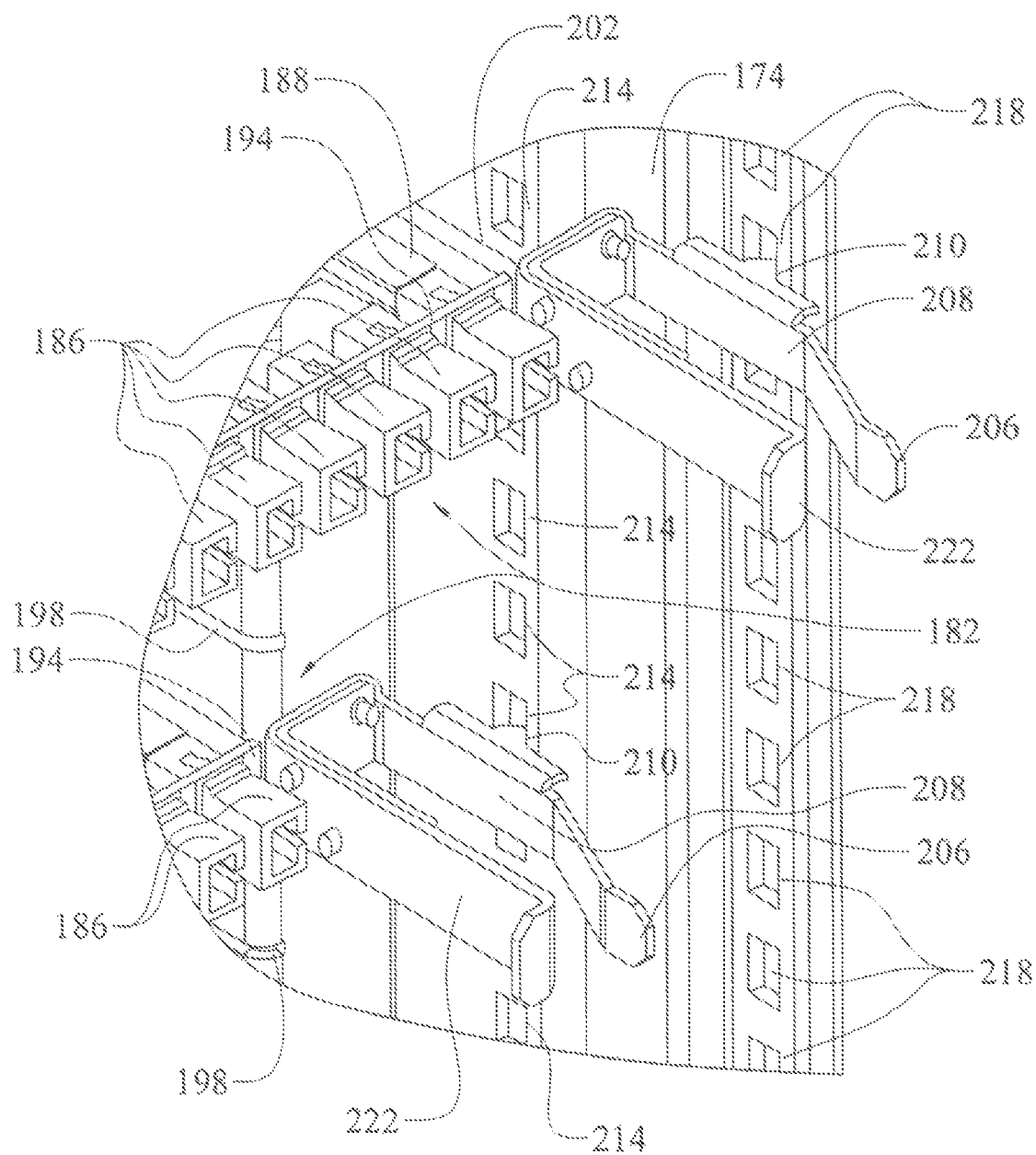
FIG. 8 is an isometric detail view of a position latching mechanism for a service connection circuit tray included in the distribution module shown FIG. 7, in accordance with various embodiments of the present disclosure.

Referring now to FIGS. 3, 7 and 8, as described above, the distribution module 46 is mounted to and supported by the distribution-side internal panel 30. Particularly, in various embodiments, a first side wall 162 of the distribution module 46 is mounted to and supported by a corner post 166, and a second side wall 170 of the distribution module 46 is mounted to and supported by a side strut 174. The corner post 166 includes a splitter-side leg that forms a portion of the splitter-side internal panel 26 and a distribution-side leg that forms a portion of the distribution-side internal panel 30. The side strut 174 is connected to a side wall 178 of the distribution hub cabinet 14.

In accordance with various embodiments, the distribution module 46 includes a plurality of service connection circuit trays 182 that each include a plurality of connection adapters 186. The connection adapters 186 are structured to receive and interlock with the output jumper connection terminals 70 at an outward end of the adapters 186. An inward end of the adapters 186 is connectable to an output feed line (not shown) that connects to the various facilities that are designated to receive the data transmissions. More particularly, each adapter 186 is configured to be connectable at the inward end to a single output feed to a single designated facility, and connectable at the outward end to a single output jumper 66. Each adapter connected at the inward end to an output feed line and at the outward end to an output jumper 66 will be referred to herein as an optic fiber circuit of the distribution module 46. Thus, to create an optic fiber circuit to provide connectivity and enable data transmission to a designated facility, a technician accesses the circuit tray 182 of the distribution module 43 containing the connection adapter 186 connected to the output feed line of the designated facility. The technician then interconnects an output jumper 66, i.e., a connection terminal 70, with the respective connection adapter 186.

In various embodiments, the circuit trays 182 are structured to slidingly transition from a stowed, or parked, position (lower tray 182 of FIGS. 7 and 8) to a deployed, or extended, position (upper tray 182 of FIGS. 7 and 8). Thus, a technician can move any desired circuit tray 182 from the stowed position to the deployed position to allow independent access to any one of the optic fiber circuits retained within the respective circuit tray 182. Accordingly, the technician can access and work on any single circuit, or numerous circuits, without disturbing the adjacent or surrounding circuits and fibers.

Referring particularly now to FIGS. 7 and 8, each circuit tray 182 includes a pair of opposing side rails 188 having a slack spool 190 and front rail 194 connected between the side rails 188, best illustrated in FIG. 7. The front rail 194 includes a plurality of apertures through which the connection adapters 186 of the respective circuit tray 182 are inserted and removably interlocked therewith. Particularly, the connection adapters 186 can be removed from the respective circuit tray 182 when the respective circuit tray 182 is in the deployed position, as described below. The slack spool 190 is utilized to organize and retain slack, i.e., additional, unutilized length, in the output feed lines connected to the connection adapters 186 of the respective circuit tray. Particularly, excess length of the output feed lines can be spooled, or wrapped, around the respective slack spool 190 to eliminate slack, and retain and organize the excess lengths of the output feed lines.

The distribution module first and second side walls 162 and 170 each include a plurality of circuit tray guides 198 that align, support and separate the circuit trays 182 retained within the distribution module 46. In various embodiments, the circuit tray guides 198 comprise spaced apart slots that extend depth-wise, i.e., from the front of the distribution module 46 to the back of the distribution module 46, along the first and second walls 162 and 170. The circuit tray side rails 188 each include fins 202 that are cooperative with and slidingly engageable with the circuit tray guides 198. That is, the fins 202 can be inserted into and slid within the guides 198 to align, support and separate the circuit trays 182 retained within the distribution module 46. Moreover, the circuit tray side rail fins 202 slidingly engage the circuit tray guides 198 such that each circuit tray 182 can be transitioned between the stowed, or parked, position and the deployed, or extended, position to provide independent access to any one of the optic fiber circuits retained in each circuit tray 182.

In various other embodiments, the circuit tray guides 198 can comprise any other suitable mechanism for slidingly engaging the circuit tray side rails 188 with the distribution module first and second side walls 162 and 170. For example, the circuit tray guides 198 can be L-brackets attached to and extending depth-wise along the distribution module first and second walls 162 and 170, whereby circuit tray side rail fins 202 set on top of and slidingly engage the L-brackets. Or, the circuit tray guides 198 can be channels formed in and extending depth-wise along the distribution module first and second walls 162 and 170, wherein the fins 202 would ride within and slidingly engage the channels. Additionally, although the circuit tray side rail fins 202 are illustrated as longitudinally extending the length of the circuit tray side rails 188, the fins 202 can comprise separate fore and aft fins along each side rail 188 or fore and aft pins or posts extending orthogonally from each side rail 188.

In various embodiments, each circuit tray 182 includes a latching mechanism 206 extending from the circuit tray side rail 188 adjacent the distribution module side strut 174, hereinafter referred to as the latch-side side rail 188. The latching mechanism 206 of each circuit tray 188 is structured to retain the respective circuit tray 182 in the stowed position and in the deployed position. The latching mechanism 206 of each circuit tray 182 comprises a spring lever 208, e.g., a spring metal lever, attached to a latch-side side rail 188 of the respective circuit tray 182. Each spring lever 208 includes a tongue 210 that is biased by the spring lever 208 to interlock with one of a plurality of stowed position receptors 214, e.g., perforations, apertures or indentions, in the side strut 174, when the respective circuit tray is in the stowed position. Therefore, each circuit tray 182 can be securely held in the stowed, or parked, position. Similarly, each spring lever tongue 210 is biased by the spring lever 208 to interlock with one of a plurality of deployed position receptors 218, e.g., perforations, apertures or indentions, in the side strut 174, when the respective tray is in the deployed position. Therefore, each circuit tray 182 can be securely held in the deployed, or extended, position to allow the technician access to each connection circuit in the respective circuit tray 182.

To transition any circuit tray 182 from the stowed position to the deployed position, and vice versa, the technician merely applies force to the respective latch mechanism spring lever 208 to move the tongue 210 out of the respective stowed or deployed receptor 214 or 218. The circuit tray 182 can then be slid along the circuit tray guides 198, as described above, to the desired deployed or stowed position. Once the circuit tray 182 is in the desired deployed or stowed position, the force to the spring lever 208 is released and the biasing properties of the spring lever 208 will force the tongue 210 into the respective deployed or stowed receptor 218 or 214, locking the circuit tray 182 in the desired deployed or stowed position.

Additionally, in various embodiments, each circuit tray includes a latch assist handle 222 extending from the latch-side side rail 188, adjacent the spring lever 208. The latch assist handle 222 is structured to assist in operation of the respective latching mechanism 206 and to assist in transitioning the respective circuit tray 182 between the stowed and deployed positions. Particularly, a technician can utilize the latch assist handle to squeeze, or pull, the spring lever 208 away from the side strut 174 to disengage the spring lever tongue 210 from the associated stowed or deployed receptor 214 or 218. The technician can then use the latch assist handle 222 to assist in pulling or pushing the respective circuit tray 182 to the desired deployed or stowed position.

Referring now specifically to FIG. 7, in various embodiments, each circuit tray 182 includes a fiber retention handle 226 extending from the circuit tray side rail 188 nearest the splitter rack 34, hereinafter referred to as the splitter-side side rail 188. The fiber retention handle 226 is also structured to assist in transitioning the respective circuit tray 182 between the stowed and deployed positions, as a technician can grasp the fiber retention handle 226 to pull or push the respective circuit tray 182 to the desired deployed or stowed position. Additionally, in various forms, each fiber retention handle 226 includes a fiber retention finger 230 at a distal end of the respective fiber retention handle 226. The fiber retention finger 230 is generally a U-shaped channel, trough or hook at the distal end of the respective fiber retention handle 226. Each fiber retention finger 230 is structured to hold, or retain, the optic fibers of the output jumpers 66 connected to the connection adapters 186 of the respective circuit tray 182. More particularly, each fiber retention FIG. 230 holds the output jumper fibers to the respective circuit tray 182 to avoid interference and/or tangling with the output jumper fibers to adjacent circuit trans 182 as the respective circuit tray 182 is transitioned between the stowed and deployed positions.

Figure 9:
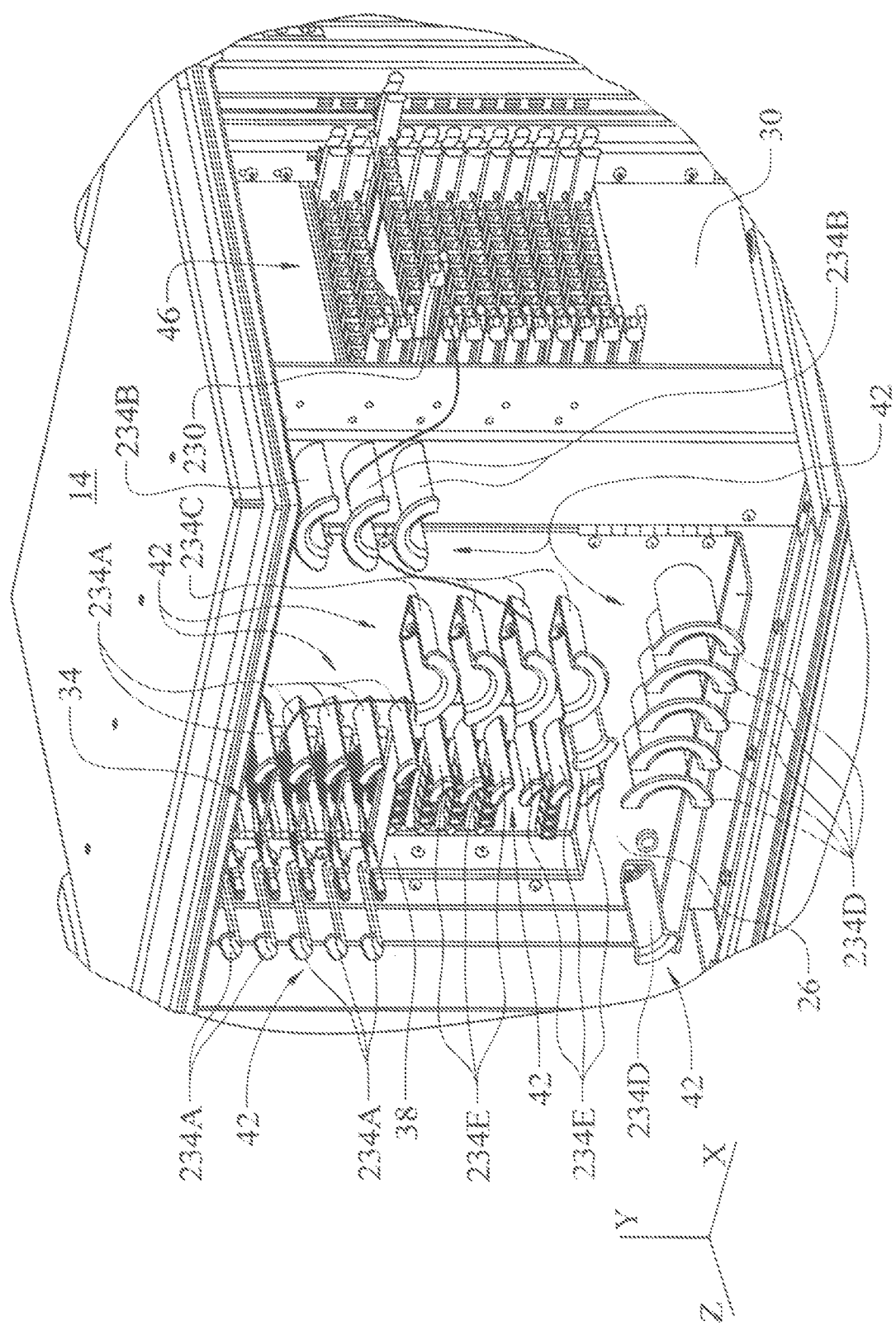
FIG. 9 is an isometric detail view of a distribution jumper incremental slack limiting fiber management system included in the distribution hub shown FIG. 1, in accordance with various embodiments of the present disclosure.

Referring now to FIG. 9, as described above, in various embodiments, the distribution hub 10 includes a distribution jumper incremental slack limiting fiber management system 42, i.e., the slack limiting system 42. As also described above, the slack limiting system 42 is utilized to organize the feeder pigtails 54 and the output jumpers 66 by reducing slack associated optic fibers of the feeder pigtails 54 and output jumpers 66, i.e., organizing the unutilized length or portions of the respective feeder pigtails 54 and the output jumpers 66. Generally, the slack limiting system 42 includes a plurality of slack limiting spools 234 around which the optic fibers of the respective feeder pigtails 54 and output jumpers 66 can be routed, or threaded, to take up any slack that may exist in the respective feeder pigtails 54 and output jumpers 66. The slack limiting spools 234 strategically located on the splitter-side internal panel 26 such that the slack of effectively any length feeder pigtail 54 or output jumper 66 can be routed through the slack limiting system, i.e., around one or more slack limiting spools 234, to reduce the slack in the respective feeder pigtails 54 and output jumpers 66. More particularly, the slack of any feeder pigtail 54 or output jumper 66 can be reduced, via the slack limiting system 42, without bending the respective feeder pigtails 54 or output jumpers 66 beyond the specified minimum radius of curvature of the optic fibers of the feeder pigtails 54 or output jumpers 66.

In various embodiments, the slack limiting system 42 includes a plurality of slack limiting spools 234 mounted to the splitter-side internal panel 26 in a substantially vertical, i.e., a Y direction, arrangement along opposing sides of the splitter rack 34, identified and referred to herein as the splitter module cage slack limiting spools 234A. Additionally, the slack limiting system 42 includes a plurality of slack limiting spools 234 mounted in a substantially vertical, i.e., a Y direction, arrangement along a side portion of the splitter-side internal panel 26 that is adjacent the distribution module 46, e.g., along a top portion of the corner post 166. These slack limiting spools 234 are identified and referred to herein as the side slack limiting spools 234B. Additionally, in various embodiments, the slack limiting system 42 can include a plurality of slack limiting spools 234 mounted in a substantially vertical, i.e., a Y direction, arrangement along an intermediate, or center, portion of the splitter-side internal panel 26. These slack limiting spools 234 are identified and referred to herein as the intermediate slack limiting spools 234C.

Furthermore, in various embodiments, the slack limiting system 42 can include a plurality of slack limiting spools 234 mounted in a substantially horizontal, i.e., a X direction, arrangement along a bottom portion of the splitter-side internal panel 26. These slack limiting spools 234 are identified and referred to herein as the bottom slack limiting spools 234D. Further yet, in various embodiments, the slack limiting system 42 can include a plurality of slack limiting spools 234 mounted in a substantially vertical, i.e., a Y direction, arrangement along at least one side of the jumper park bay 38. These slack limiting spools 234 are identified and referred to herein as the park bay slack limiting spools 234E. Although the slack limiting spools 234 are illustrated as half spools, the slack limiting spools 234 could be whole spools or any other rod, cylinder, bobbin post or appendage suitable to route the feeder pigtails 54 and output jumpers 66 to reduce the slack without bending the respective feeder pigtails 54 and output jumpers 66 beyond the specified minimum radius of curvature of the optic fibers of the feeder pigtails 54 or output jumpers 66.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A universal splitter module holder for retaining any one of a plurality of differently sized fiber optic splitter modules within a fiber optic distribution hub, said universal splitter module holder comprising a base and a hood removably connectable to the base to removably clamp the any one of a plurality of differently sized fiber optic splitter modules between the base and the hood to removably retain the any one of a plurality of differently sized fiber optic splitter modules within the universal splitter module holder.

2. The universal splitter module holder of claim 1, further comprising a compressible pad affixed to a bottom of the hood for engaging the splitter module and retaining the splitter module within the universal splitter module holder when the hood is removably connected to the base.

3. The universal splitter module holder of claim 2, wherein the hood comprises a first end hingedly coupled to a first wall of the base, and a second end removably connectable with a second wall of the base.

4. The universal splitter module holder of claim 2, wherein the hood comprises a first end having a tab interlockingly engageble with a slot in a first wall of the base, and a second end having a tab interlockingly engageble with a slot in a second wall of the base.

5. The universal splitter module holder of claim 2, wherein the holder comprises at least one latching mechanism for removably retaining the module engaged with an internal panel of the distribution hub.

6. The universal splitter module holder of claim 5, wherein the latching mechanism comprises at least one screw extending through at least one stop tab of the base, the screw threadable into an internal panel of the distribution hub.

7. The universal splitter module holder of claim 5, wherein the latching mechanism comprises at least one screw extending through at least one stop tab of the base, the screw threadable into an internal panel of the distribution hub.

8. The universal splitter module holder of claim 1, wherein the hood comprises a first end hingedly coupled to a first wall of the base, and a second end removably connectable with a second wall of the base.

9. The universal splitter module holder of claim 8, wherein the holder comprises at least one latching mechanism for removably retaining the module engaged with an internal panel of the distribution hub.

10. The universal splitter module holder of claim 9, wherein the latching mechanism comprises at least one screw extending through at least one stop tab of the base, the screw threadable into an internal panel of the distribution hub.

11. The universal splitter module holder of claim 1, wherein the hood comprises a first end having a tab interlockingly engageble with a slot in a first wall of the base, and a second end having a tab interlockingly engageble with a slot in a second wall of the base.

12. The universal splitter module holder of claim 11, wherein the holder comprises at least one latching mechanism for removably retaining the module engaged with an internal panel of the distribution hub.

13. The universal splitter module holder of claim 1, wherein the holder comprises at least one latching mechanism for removably retaining the module engaged with an internal panel of the distribution hub.

14. The universal splitter module holder of claim 13, wherein the latching mechanism comprises at least one screw extending through at least one stop tab of the base, the screw threadable into an internal panel of the distribution hub.

15. The universal splitter module holder of claim 1, wherein the base includes fins along opposing side walls, the fins slideably engageable with guides along opposing walls of a splitter module rack of the distribution hub.

16. A universal splitter module holder for retaining any one of a plurality of differently sized fiber optic splitter modules within a fiber optic distribution hub, said universal splitter module holder comprising a base and a hood removably connectable to the base to removably clamp the any one of a plurality of differently sized fiber optic splitter modules between the base and the hood to removably retain the any one of a plurality of differently sized fiber optic splitter modules within the universal splitter module holder, wherein the base includes fins along opposing side walls, the fins slideably engageable with guides along opposing walls of a splitter module rack of the distribution hub.

17. The universal splitter module holder of claim 16, further comprising a compressible pad affixed to a bottom of the hood for engaging the splitter module and retaining within the universal splitter module holder the splitter module when the hood is removably connected to the base.

18. The universal splitter module holder of claim 16, wherein the hood comprises a first end hingedly coupled to a first wall of the base, and a second end removably connectable with a second wall of the base.

19. The universal splitter module holder of claim 16, wherein the hood comprises a first end having a tab interlockingly engageble with a slot in a first wall of the base, and a second end having a tab interlockingly engageble with a slot in a second wall of the base.

20. The universal splitter module holder of claim 16, wherein the holder comprises at least one latching mechanism for removably retaining the module engaged with an internal panel of the distribution hub.

21. The universal splitter module holder of claim 20, wherein the latching mechanism comprises at least one screw extending through at least one stop tab of the base, the screw threadable into an internal panel of the distribution hub.

22. A method for removably retaining any one of a plurality of differently sized fiber optic splitter modules within a fiber optic distribution hub, said method comprising removably clamping a fiber optic splitter module between a base of a universal splitter module and a hood of the universal splitter module removably connectable to the base and removably storing the universal splitter module holder within a splitter module rack of the distribution hub.

23. The method of claim 22, wherein retaining the fiber optic splitter module within the universal splitter module holder comprises affixing a compressible pad to a bottom of the hood to compressively engage the splitter module and retain the splitter module within the universal splitter module holder when the hood is removably connected to the base.

24. The method of claim 22, wherein retaining the fiber optic splitter module within the universal splitter module holder comprises hingedly coupling a first end of the hood to a first wall of the base, and removably connecting a second end of the hood with a second wall of the base.

25. The method of claim 22, wherein retaining the fiber optic splitter module within the universal splitter module holder comprises interlockingly engaging a tab of a first end of the hood with a slot in a first wall of the base, and interlockingly engaging a tab of a second end of the hood with a slot in a second wall of the base.

26. The method of claim 22, wherein removably storing the universal splitter module holder within the splitter module rack comprises removably retaining the module engaged with an internal panel of the distribution hub utilizing at least one latching mechanism operably connectable with at least one stop tab of the base.

27. The method of claim 26, wherein removably retaining the module engaged with an internal panel of the distribution hub utilizing at least one latching mechanism extending at least one screw through the at least one stop tab of the base, and threading the screw into the internal panel of the distribution hub.

28. The method of claim 22, wherein removably storing the universal splitter module holder within the splitter module rack comprises slideably engaging fins included along opposing sides of the base with guides along opposing walls of a splitter module rack of the distribution hub.

* * * * *